June 4, 1963  M. A. LUND ET AL  3,092,138
PIVOTED CHECK VALVE
Filed Jan. 14, 1960  3 Sheets-Sheet 1

Inventors,
Martin A. Lund
& Joe Alsenz,
By: Schneider, Dressler, Goldsmith & Clement
Attys.

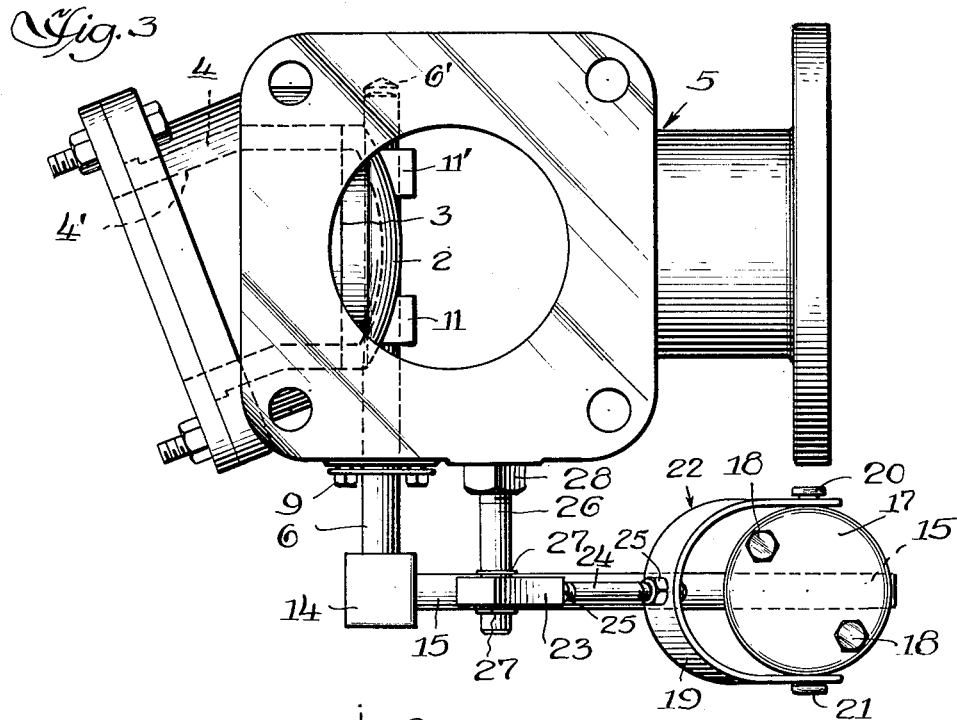
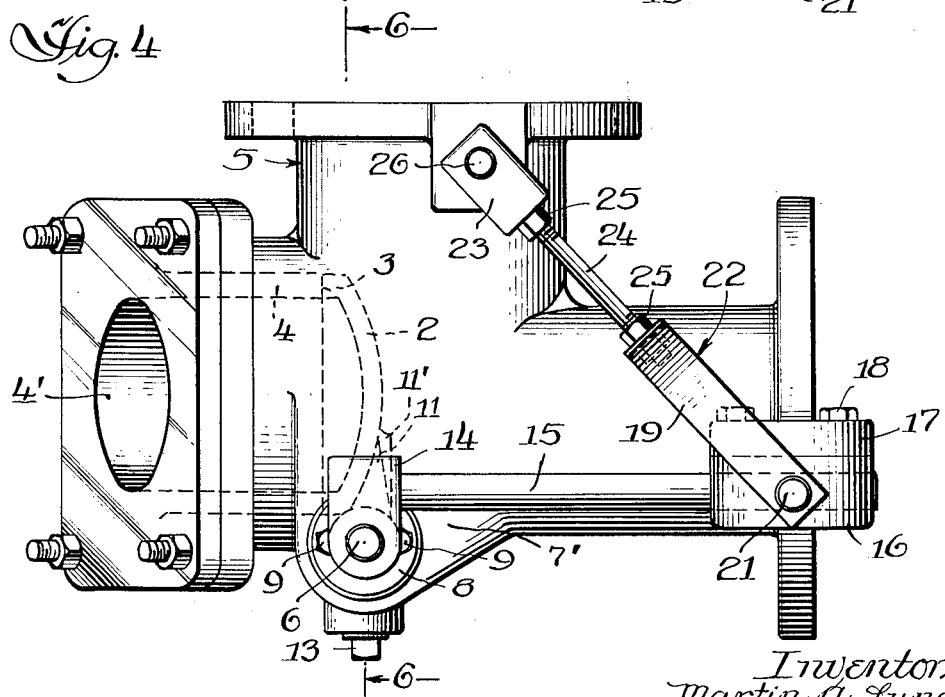

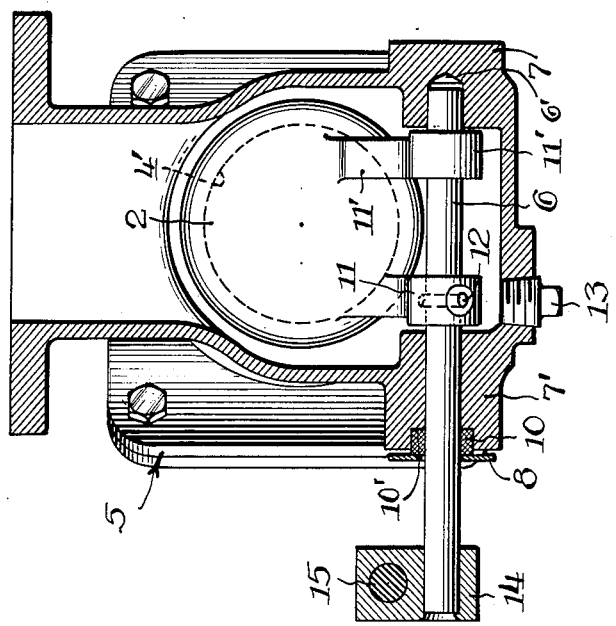
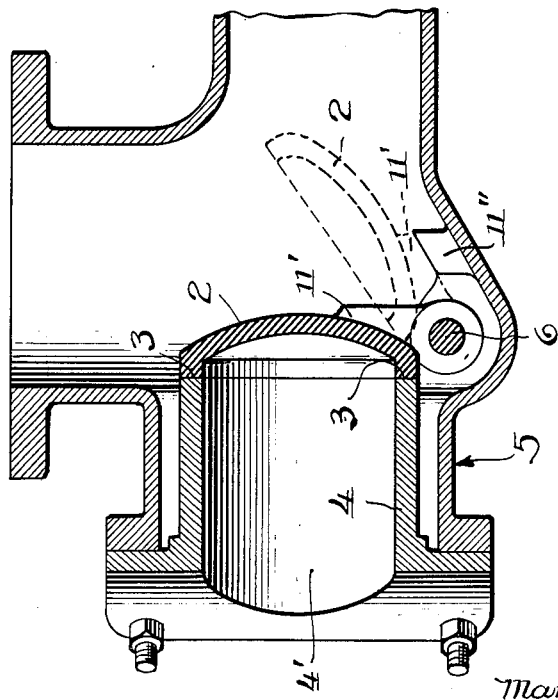

United States Patent Office 3,092,138
Patented June 4, 1963

3,092,138
PIVOTED CHECK VALVE
Martin A. Lund and Joe Alsenz, Chicago, Ill., assignors to FMC Corporation, a corporation of Delaware
Filed Jan. 14, 1960, Ser. No. 2,368
2 Claims. (Cl. 137—514)

This invention relates to a valve, and is particularly concerned with means for preventing a valve that is closed automatically by fluid pressure from being slammed into closing position.

Although the invention may be utilized with many different types of valves, the invention will be described in specific relationship to a by-pass valve used in conjunction with a pump for discharging sewage from a sewage basin. The flow of sewage in installations of this type is normally directed by a fitting having three openings, each extending in a different direction. One of the openings communicates with a reverse flow conduit through which sewage may flow in either direction. The second opening communicates with a conduit leading to the pump. The third opening communicates with a sewage basin. A by-pass valve pivotally mounted in the fitting is adapted to open or close the third opening.

During the inflow, when sewage is flowing into the basin, the pump is idle and the by-pass valve is open so that the sewage passing through the fitting enters through the first opening and flows out of the fitting through the third opening without passing through the pump. When the sewage level reaches a predetermined height the pump starts operating and pumps the sewage from the basin and discharges it through the fitting. The pumped sewage impinges on the back of the by-pass valve to move it to closed position, and then passes out through the first opening and through the reverse flow conduit to an outlet.

Although the by-pass valve is generally provided with a spring urging it toward open position, the pressure of the pump sewage is much greater than the resisting force of the spring. Accordingly, a by-pass valve that is closed by the pressure of sewage pumped from the basin is slammed into closed position with considerable noise and chattering. Many different means have been tried to reduce the noise of closing the by-pass valve, but none has proved to be as effective as the means hereinafter disclosed.

In accordance with the present invention, a by-pass valve adapted to be seated adjacent an opening in a fitting is pivotally mounted at one edge of the opening by means of a shaft which is rotatably mounted in the fitting and is rigidly secured to hinge lugs integral with the valve. One end of the shaft projects outwardly from the fitting. An arm is rigidly fixed at one end to the outwardly projecting portion of the shaft and extends therefrom at right angles. A variable weight is slidably mounted on the arm, and a link having one end pivotally secured to the fitting has its other end pivotally secured to the weight.

When the valve is open the link is so positioned that the weight is adjacent the shaft. In this location the weight offers little resistance to the closing movement of the valve. As the valve moves toward closed position the arm swings pivotally with the shaft, and the fixed position of one end of the link causes it to move the weight outwardly along the arm. The resistance to the closing movement of the valve increases as the weight is moved outwardly from the axis of the shaft, and reaches its maximum as the valve is moved into contact with its seat.

At the start of its closing movement the valve moves freely, but force required to move the valve increases with the increase of the radius between the weight and shaft about which it is pivotally moved. At the valve approaches its seat the closing movement is slowed down gradually by the increased resistance to the pivotal movement of the valve. The amount of weight is adjusted so that the pressure exerted against the valve by the flowing sewage is sufficient to close the valve against the force of said weight in the outermost position of said weight on the arm on which it slides, but is not sufficient to slam the valve shut against the force of said weight.

The structure by means of which the above-mentioned and other advantages of the invention are attained will be described in the following specification, taken in conjunction with the accompanying drawings showing a preferred illustrative embodiment of the invention, in which:

FIG. 3 is a top plan view of the fitting with the valve in its closed position;

FIG. 4 is a side elevational view, similar to FIG. 1, with the valve in its closed position;

FIG. 5 is a fragmentary cross sectional view through the fitting, with the valve in its closed position, and indicating the open position of the valve in dotted lines, and FIG. 6 is a vertical sectional view, taken along the line 6—6 of FIG. 4.

Figure 1:
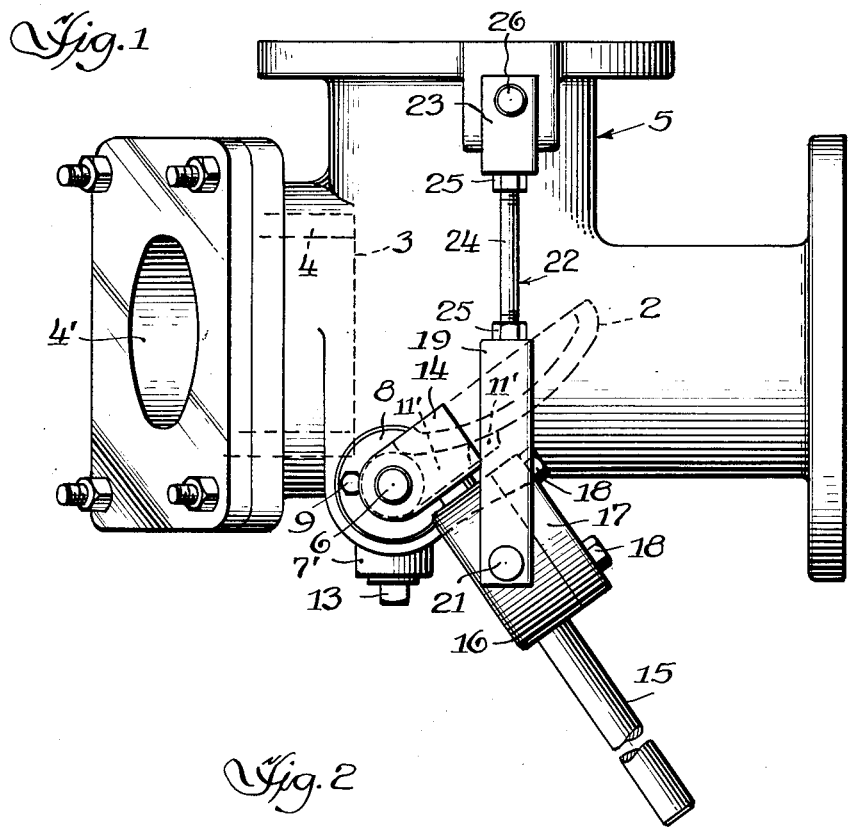
FIGURE 1 is a side elevational view of a fitting embodying the invention with the valve in its open position, the valve being shown in dotted lines.

In the drawings, a valve 2 is hinged to fit against a seat 3 formed by the inner edge of a cylindrical wall 4 that encircles an opening 4' in a fitting 5. A shaft 6 is rotatably mounted in fitting 5 in any suitable manner. As shown in FIG. 6, one end of shaft 6 is mounted in a blind recess 6' located in a thickened wall portion 7 of fitting 5 a short distance rearwardly of the inner edge of cylindrical wall 4. The other end of shaft 6 extends through an opposite thickened wall portion 7' of the fitting. A flat annular packing plate 8 secured to one side of the fitting by screws or bolts 9 holds packing 10 in a recess 10' in the outer surface of thickened wall portion 7'. Shaft 6 extends through packing plate 8, packing 10 and through aligned openings in a pair of hinge lugs 11 and 11' projecting rearwardly from one edge of the valve.

A pin 12 extends through shaft 6 and hinge lug 11 to provide a rigid connection between shaft 6 and valve 2 so that the shaft rotates with the valve as the valve is moved between its open and closed positions. A removable plug 13 provides access to pin 12 so that shaft 6 can be secured to lug 11. Although the lugs are preferably cast with the valve, they may be separate members secured to the valve in any suitable manner. The valve is moved between its open and closed positions by the pressure of liquid flowing through the fitting, depending upon the direction of flow. Lug 11' is longer than lug 11 and is shaped to engage a projection 11" extending upwardly from one wall of the fitting, as shown in FIG. 5, to prevent the valve from opening too far.

A block 14 is rigidly secured to the end of shaft 6 that extends outside the fitting so as to rotate with the shaft. An arm 15 having one end rigidly secured in block 14 extends at right angles to shaft 6. Arm 15 serves as a guide for a block 16 slidably mounted thereon. The upper face of block 16 is provided with a plurality of threaded recesses (not shown) and a weight 17 is detachably secured to block 16 by screws 18 threaded into said recesses. Weight 17 may be removed and replaced by a heavier or lighter weight, as desired.

Figure 2:
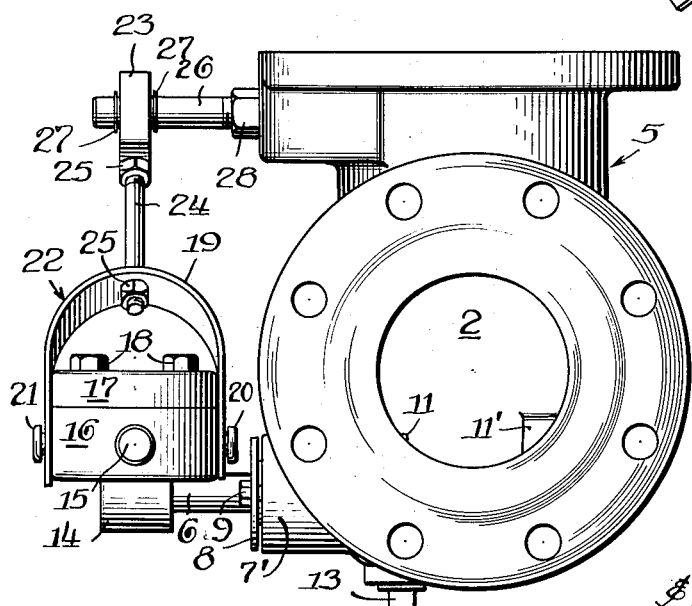
FIG. 2 is a rear elevational view of the fitting with the valve in its closed position.

A bail 19 has its opposite ends pivotally secured to block 16 at diametrically opposite edges, as indicated at 20 and 21, FIGS. 2 and 3. Bail 19 comprises one portion of a link 22 that includes a pivot arm 23 and a rod 24 secured to bail 19 and pivot arm 23 by means of nuts 25. Nuts 25 permit adjustment of the overall length of link 22. For proper operation, link 22 must be aligned in the vertical plane of arm 15, and pivot arm 23 is held in position in said plane on a stud 26 by retaining rings 27, as shown in FIG. 2. Stud 26 is secured to one side of fitting 5 by a nut 28 and extends therefrom parallel to shaft 6.

The pivotal connections at each end of link 22 and the longitudinal adjustability of the link permit locating block 16 and weight 17 in any desired position along the length of arm 15. Since arm 15 must be lifted to horizontal position by valve 2 as the valve is moved to its closed position, it is obvious that the force required to move the valve toward its closed position is increased by any increase in the amount of weight secured to block 16, and by an increase in the distance of the block and weight from the axis of shaft 6.

The operation of the valve closing mechanism is very simple. When valve 2 is open, block 16 is close to shaft 6, as shown in FIG. 1, and offers a minimum of resistance to movement of the valve toward its closed position. Since the length of link 22 does not change during the closing movement of the valve, block 16 and weight 17 move outwardly along arm 15 as the valve moves toward its closed position and arm 15 moves closer to stud 26 on which link 22 is pivoted. Each increment of the outward movement of the block and weight increases the resistance to the movement of valve 2 towards its closed position so that the resistance reaches its maximum at the instant of closing. The resistance may be regulated by changing the length of link 22 or the amount of weight on block 16, so that any desired resistance may be provided, depending upon the pressure normally exerted by the liquid tending to close the valve.

The pivotal movement of arm 15 is limited by the angular movement of valve 2 between its open and closed positions. The sliding movement of block 16 and weight 17 is controlled by the pivotal movement of arm 15 and the length of link 22 between its pivot joints 21 and 26. It is desirable that link 22 be long enough to make the sliding movement of block 16 and weight 17 sufficient to effect a substantial change in the force required to move the valve toward its seat between the beginning and the end of the valve closing movement.

Although we have described a preferred embodiment of the invention in considerable detail, it will be understood that the description is intended to be illustrative, rather than restrictive, as many details of the structure may be modified or changed, without departing from the spirit or scope of the invention. Accordingly, we do not desire to be restricted to the exact structure described.

We claim:
1. In combination with a fitting, a valve seat located in said fitting, a valve pivotally mounted in said fitting to move toward and away from said valve seat, said valve being movable toward said valve seat by pressure of fluid flowing through said fitting, an arm extending angularly to said valve and operatively connected thereto, whereby said arm moves pivotally with pivotal movement of said valve, means on said arm resisting pivotal movement of said valve toward said valve seat, and means connected to said arm in such a manner as to move said first mentioned means relative to said arm in a direction away from said valve as said valve is moved toward said valve seat, whereby the resistance of said first mentioned means to movement of said valve toward said valve seat is increased throughout the range of movement of said valve as it approaches said valve seat, the increase in resistance to movement of said valve toward its closed position being effective to decrease the rate of movement of said valve, whereby the striking force of said valve against the valve seat is minimized.

2. In combination with a fitting having an opening, a valve seat encircling said opening, a shaft pivotally mounted in said fitting rearwardly of said valve seat, said shaft extending transversely of said fitting, a valve fixed at one edge to said shaft, said valve being movable into closed position in engagement with said valve seat by pressure of fluid flowing through said fitting, an arm rigidly connected to said shaft, a weight slidably mounted on said arm, said weight resisting movement of said valve toward its closed position, and a link pivotally connected to said fitting and to said weight in such a manner that it moves said weight along said arm in a direction away from said shaft when said valve is moved toward its closed position, whereby the resistance of said weight to closing movement of said valve is increased throughout the range of movement of said valve as it approaches its closed position, the increase in resistance to the movement of said valve toward its closed position being effective to decrease the rate of movement of said valve, whereby the striking force of said valve against the valve seat is minimized.

References Cited in the file of this patent
UNITED STATES PATENTS

| | | |
|---|---|---|
| 407,981 | Williams | July 30, 1889 |
| 982,400 | Walker | Jan. 24, 1911 |
| 1,518,353 | Ralston | Dec. 9, 1924 |
| 2,141,711 | Guthrie | Dec. 27, 1938 |
| 2,358,260 | Simpson | Sept. 12, 1944 |
| 2,368,149 | Lee | Jan. 30, 1945 |

FOREIGN PATENTS

| | | |
|---|---|---|
| 9,056 | Great Britain | Apr. 19, 1898 |